United States Patent
Chaikheawgaw et al.

(10) Patent No.: US 12,543,771 B2
(45) Date of Patent: Feb. 10, 2026

(54) BATTER SHOWERING APPARATUS AND APPLICATION METHOD

(71) Applicant: Cargill, Incorporated, Wayzata, MN (US)

(72) Inventors: Pacharada Chaikheawgaw, Nan (TH); Preeyanuch Chaiprasitphon, Bangkok (TH); Jutamas Khongpoonvirun, Muang Nakhonratchasima (TH)

(73) Assignee: Cargill, Incorporated, Wayzata, MN (US)

( * ) Notice: Subject to any disclaimer, the term of this patent is extended or adjusted under 35 U.S.C. 154(b) by 254 days.

(21) Appl. No.: 18/568,021

(22) PCT Filed: Jun. 8, 2022

(86) PCT No.: PCT/US2022/032688
§ 371 (c)(1),
(2) Date: Dec. 7, 2023

(87) PCT Pub. No.: WO2022/261218
PCT Pub. Date: Dec. 15, 2022

(65) Prior Publication Data
US 2024/0130414 A1     Apr. 25, 2024

Related U.S. Application Data

(60) Provisional application No. 63/208,064, filed on Jun. 8, 2021.

(51) Int. Cl.
*A23P 20/12*     (2016.01)
*A23L 5/10*      (2016.01)
*A23L 13/50*     (2016.01)

(52) U.S. Cl.
CPC .............. *A23P 20/12* (2016.08); *A23L 5/11* (2016.08); *A23L 13/57* (2016.08)

(58) Field of Classification Search
CPC .......... A23P 20/12; A23P 20/15; A23L 13/03; A23L 13/57; A23L 5/11; A47J 37/12; A21D 13/60
See application file for complete search history.

(56) References Cited

U.S. PATENT DOCUMENTS

| | | | | |
|---|---|---|---|---|
| 4,744,994 A | * | 5/1988 | Bernacchi | A23L 13/57 426/89 |
| 5,908,648 A | * | 6/1999 | Afman | A23L 13/57 426/296 |
| 6,251,455 B1 | | 6/2001 | Thomas | |

FOREIGN PATENT DOCUMENTS

| | | |
|---|---|---|
| EP | 2364593 A1 | 9/2011 |
| EP | 2481295 A1 | 8/2012 |

* cited by examiner

*Primary Examiner* — Michele L Jacobson (57) ABSTRACT

A method of coating batter onto food products, including the steps of conveying at least one food product on atop surface of a conveyor toward a battering machine, conveying the at least one food product under a batter distribution chamber of the battering machine, wherein the batter distribution chamber comprises a plurality of spaced apertures extending through a bottom distribution chamber surface through which batter is dispensable, and wherein the batter distribution chamber oscillates in a direction that is generally perpendicular to a direction in which the at least one food product is being conveyed, and dispensing batter from the plurality of spaced apertures onto an outer surface of the at least one food product to provide a pattern of batter stripes on the outer surface.

13 Claims, 6 Drawing Sheets

BATTER SHOWERING APPARATUS AND APPLICATION METHOD

CROSS-REFERENCE TO RELATED APPLICATIONS

This application is a national phase application of PCT Application No. PCT/US2022/032688, filed Jun. 8, 2022, which claims the benefit of U.S. Provisional Patent Application No. 63/208,064, filed 8 Jun. 2021, each of which is hereby incorporated by reference in its entirety.

TECHNICAL FIELD

The present invention generally relates to an apparatus and method for applying a pattern of coating material onto a food product, and more specifically relates to an apparatus and method for applying a striped coating of batter (e.g., tempura batter) to food products moving along a production line.

BACKGROUND

Pre-cooked or "ready-to-heat" food products have been available for many years, which provide consumers with the ability to simply remove a food product from its packaging and prepare it in a conventional oven, a toaster oven, or a microwave oven according to provided cooking instructions. In many cases, such food products are in a frozen state prior to cooking. Typically, no additional ingredients or preparations are required prior to defrosting and/or heating the products to an acceptable serving temperature. Depending on the cooking method, the quality of the cooked food products is often at least somewhat different than the quality of similar items that are prepared from scratch. However, the consumer is often willing to sacrifice some amount of food quality or freshness to take advantage of the convenience of these pre-cooked food products.

Individual pieces of chicken in the form of chicken patties or strips are particularly popular food products that are provided in such a manner. In one exemplary process, chicken pieces are selected and/or formed to meet certain size and shape parameters, after which they are dipped or dredged through batter so that they are covered with a uniform batter or coating layer. The coated chicken pieces are then sent to an appropriate cooking apparatus (e.g., oven or fryer) where they are at least partially cooked. The chicken pieces can then be frozen, bagged, boxed, and shipped to a distribution center, grocery store, restaurant, or intermediate storage location where they will typically remain frozen until immediately prior to the final cooking process.

Although the above-described preparation methods can be adequate for food products having coatings that are generally uniform over the surface of the food pieces, some food products would more desirably be provided with a coating having an external texture that is more similar to that of a freshly prepared food item. Thus, there is a desire for apparatuses and methods of applying a coating material that provide such an external texture to food products.

SUMMARY

Aspects of the invention described herein are directed to a coating apparatus and method for applying a pattern of coating on a food product, such as chicken pieces. In embodiments of the invention, the coating apparatus applies batter to food products in a manner that results in a raised pattern of coating stripes that are both aesthetically pleasing and that provide an appealing texture when consumed. This is accomplished by moving food products on a conveyor past or under an apparatus that "showers" such food products with stripes of batter. The stripes of batter can be straight, wavy, or irregular, but are generally consistent for all of the pieces of each batch of food products.

In aspects of the invention, a coating apparatus is used for providing a second or outer coating onto food products, although the apparatus can additionally or alternatively be used for a single layer coating operation and/or to add layer(s) beyond a second layer. The coating layer may be a batter such as a tempura batter that "puffs up" when fried to provide a crunchy or crispy texture, for example.

In an aspect of the invention, a method of coating batter onto food products is described, comprising the steps of: conveying at least one food product on a top surface of a conveyor toward a battering machine; conveying the at least one food product under a batter distribution chamber of the battering machine, wherein the batter distribution chamber comprises a plurality of spaced apertures extending through a bottom distribution chamber surface through which batter is dispensable, and wherein the batter distribution chamber oscillates in a direction that is generally perpendicular to a direction in which the at least one food product is being conveyed; and dispensing batter from the plurality of spaced apertures onto an outer surface of the at least one food product to provide a pattern of batter stripes on the outer surface.

In an aspect of the invention, the food product(s) may be conveyed at a speed that provides a predetermined pattern of batter stripes on the outer surface of the food product(s). In addition, the step of conveying the food product(s) under the batter distribution chamber may include oscillating the batter distribution chamber at a frequency and amplitude that provides a desired pattern of batter stripes on the outer surface of the food product(s).

The method may further include a step of directing overflow batter to a supply container after the step of dispensing batter onto the outer surface of the food product(s). This method may further include combining overflow batter with new batter in the supply container to provide a batter mixture for use in the step of dispensing batter from the plurality of spaced apertures onto the outer surface of the food product(s).

In an aspect of the invention, the method may further include a step of frying the food product(s) in a first fryer prior to the step of conveying at least one food product on a top surface of a conveyor toward a battering machine. The method may additionally include a step of frying the food product(s) in a second fryer after the step of dispensing batter from the plurality of spaced apertures onto an outer surface of the food product(s). The method may additionally include a step of baking the food product(s) after the step of frying the food product(s) in a second fryer.

These and various other features and advantages will be apparent from a reading of the following detailed description.

BRIEF DESCRIPTION OF THE DRAWINGS

Exemplary apparatuses and methods will be further explained with reference to the appended Figures, wherein like structure is referred to by like numerals throughout the several views, and wherein.

DETAILED DESCRIPTION

Figure 1:
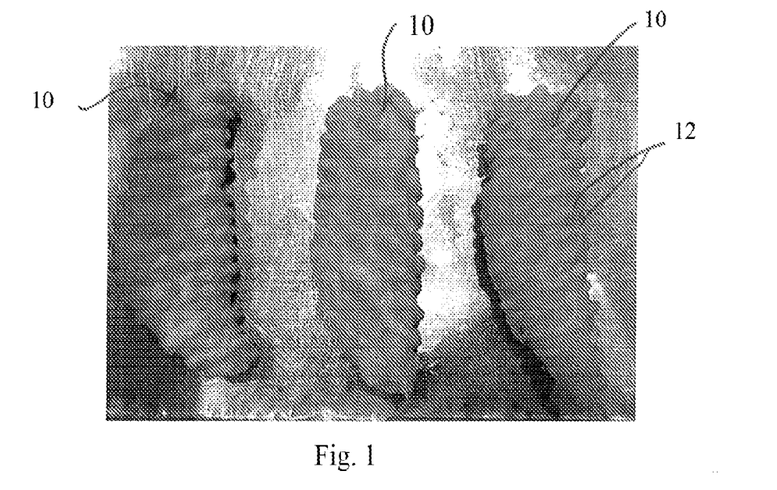
FIG. 1 is a top view of exemplary food products that were coated using the batter application apparatus and methods described herein.

Referring now to the Figures, wherein the components are labeled with like numerals throughout the several Figures, and initially to FIG. 1, three chicken pieces 10 are illustrated, each of which includes an outer coating having a pattern of raised batter stripes 12. Batter stripes 12 are shown as being at a generally uniform spacing across each of the chicken pieces 10, but they can instead be spaced at different distances from each other and can have the same or different heights, widths, and lengths from adjacent stripes 12 on the same chicken pieces 10. The spaces between adjacent stripes 12 may include a batter coating that is the same or different coating from the coating material of the stripes 12.

Figure 2:
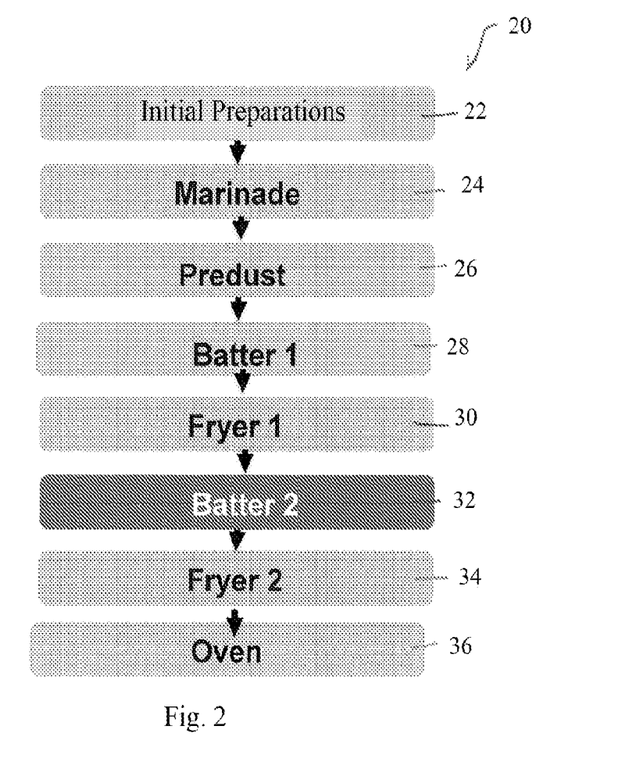
FIG. 2 is a flow chart of an exemplary series of steps for producing food products using the batter application apparatus and methods described herein.
Figure 3:
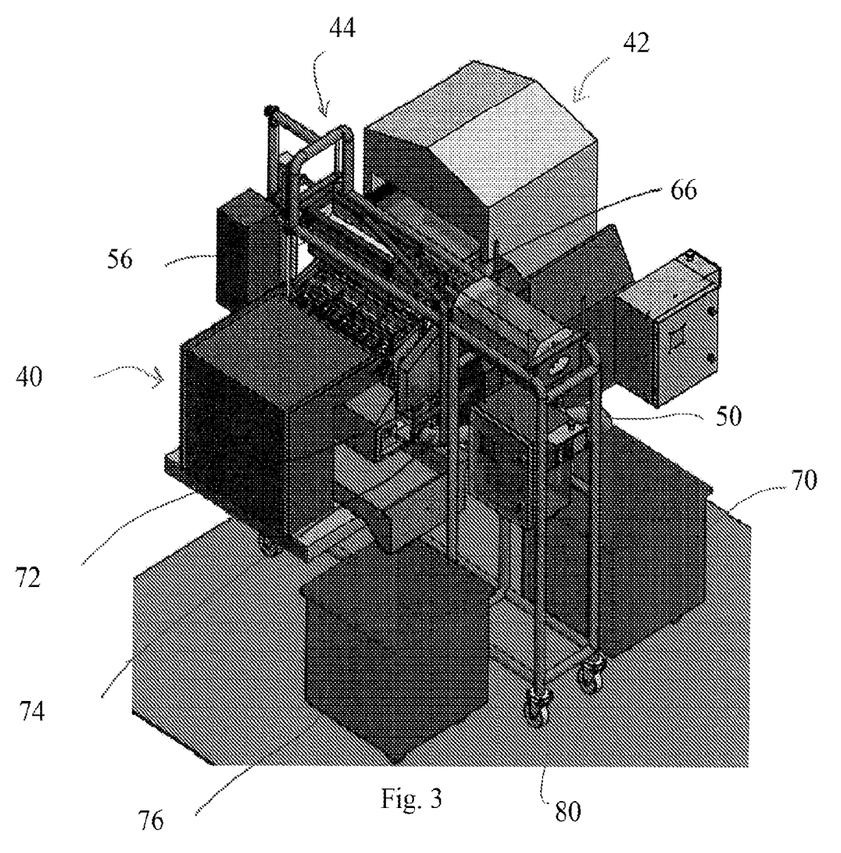
FIG. 3 is a perspective view of an exemplary embodiment of equipment for frying and applying batter to food products.
Figure 4:
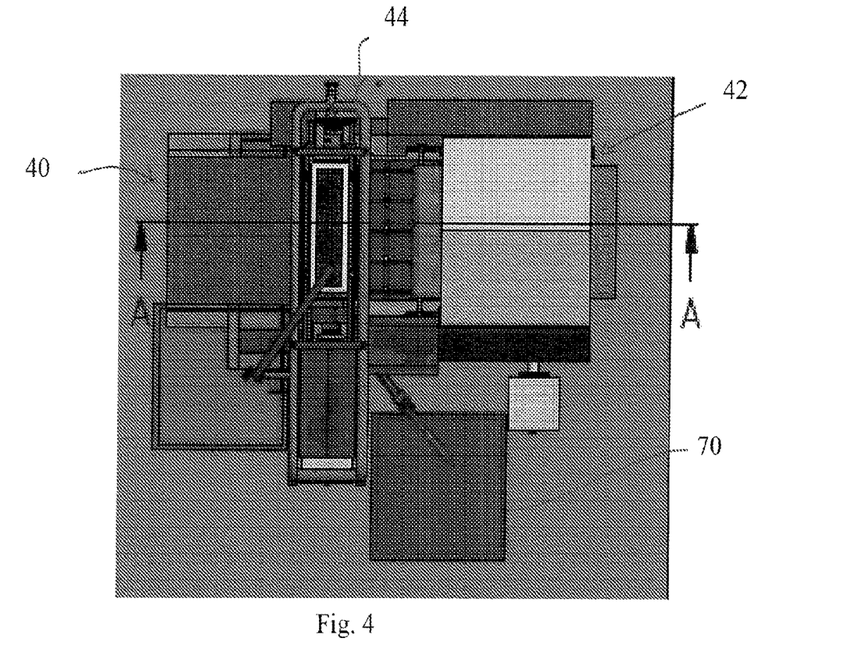
FIG. 4 is a top view of the equipment illustrated in FIG. 3.
Figure 5:
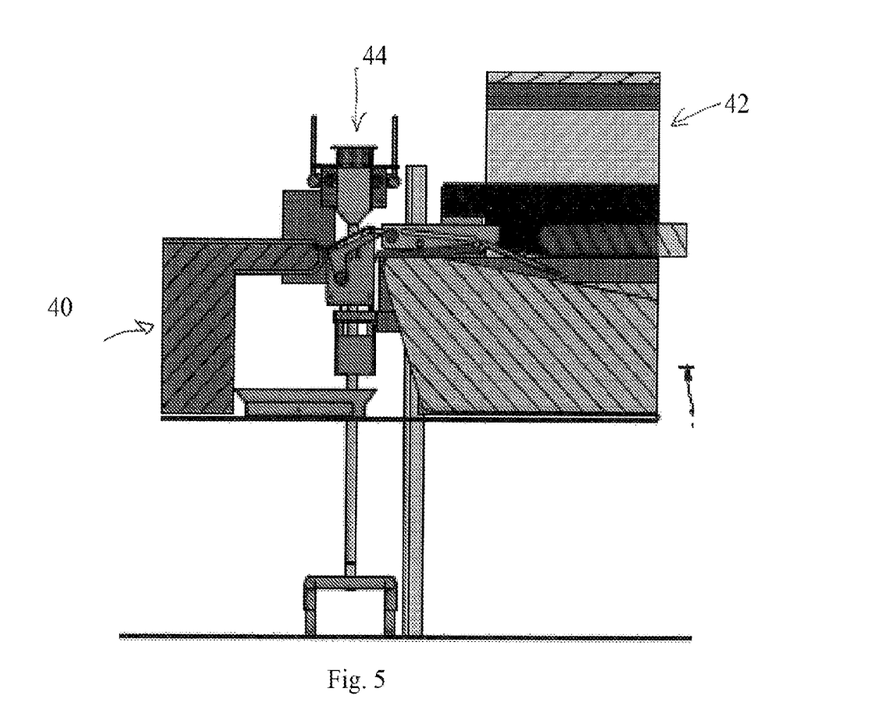
FIG. 5 is a cross-sectional view taken along section line A-A of the equipment illustrated in FIG. 4.

FIG. 2 is a flow chart of an exemplary method 20 for producing food products using the batter application apparatus and methods described herein, which are intended to be illustrative. In some embodiments, method 20 may be accomplished with one or more additional operations not described, and/or without one or more of the operations discussed. Additionally, the order in which the operations of method 20 are illustrated in FIG. 2 and described below is not intended to be limiting, and it is contemplated that at least some of the steps occur in a different order than shown and/or that some of the steps can be eliminated or duplicated.

In embodiments, steps of the method 20 may be controlled by one or more processing devices that electronically process information to coordinate the various food cooking and production steps. The processing devices may include one or more devices executing some or all of the operations of method 20 in response to instructions stored on an electronic storage medium. The processing devices may include one or more devices configured through hardware, firmware, and/or software to be specifically designed for execution of one or more of the operations of method 20.

With continued reference to FIG. 2, the illustrated method 20 generally includes providing raw food products (e.g., chicken strips) to a production line where a number of processing steps occur. After these processing steps take place, the food products are generally frozen and packaged. Typically, the only further steps that a consumer will need to take prior to consuming the food products are to remove the frozen food products from their packaging and then follow provided instructions to cook the food products in some type of oven.

In more particularity, exemplary method 20 first includes a step or operation 22 in which food products are prepared for processing. This step 22 may include weighing the food products, inspecting food products to be sure they are the correct size and shape for processing, controlling the temperature at which the food products are stored until they are provided to the production line, and the like. For one example, the food products provided are steamed chicken breast strips, which can be both skinless and boneless (e.g., skinless, boneless breasts known in the art as SBB strips). These strips can be provided in either a frozen format or at least partially thawed, as desired for a particular processing sequence. The food products can also optionally be marinated or otherwise processed to modify the taste, texture, or other properties of the food products, as represented by step or operation 24. The food products are then ready for further processing on a production line.

A wide variety of methods and equipment can be used to introduce the food products to the production line. For one example, the food products are supplied in bulk to a hopper or other large vessel having features for depositing the food products in a controlled manner onto the conveyor in a single layer. For another example, the food products can be removed from a bulk container by hand or another transferring mechanism and placed in desired and/or predetermined locations on a moving conveyor. Other methods and equipment for placing food products on a conveyor are also contemplated.

The food products are conveyed until they reach a pre-dusting station where a pre-dusting step or operation 26 takes place. In this step, the food products are coated with a pre-dust product, which is generally designed or selected to prepare the surface of the food products for the adhesion of coating or other materials. The pre-dust product can further be designed or selected to absorb moisture from the food products, to enhance the ability of the coating to adhere to these products, to improve yield, to add flavor to the food products, to improve crispiness of the food products, to provide a consistent surface to which batter can be applied (i.e., coating stability), and/or the like. The pre-dust material can be provided as a powder, and can include one or more types of flour and/or cornstarch, for example.

The pre-dusted food products are then further conveyed or otherwise transported to a first batter station where a first exemplary battering step or operation 28 takes place. In this first battering step 28, batter may be provided in a trough or tray containing a volume of batter through which the food products are conveyed or otherwise transported. Batter may alternatively or additionally be applied using a batter shower that extends across the width of the conveyor as a constant stream of batter material. In such a case, it is possible for batter to be applied to the bottom side of each food product by passing through a trough or tray while batter is applied to the top side of each food product by passing it under a stream of batter material. A number of different batter application methods and apparatuses may alternatively be used to apply a first batter layer to one or both sides of the food products. The first batter is designed or selected to interact with the pre-dust material on the outside of the food products so that a desired amount of first batter "sticks" to the food products.

The battered food products are then further conveyed to a first fryer in which they are deep fried in an edible oil during a first frying step or operation 30. The food products are fried at a suitable temperature and time until the first batter layer is sufficiently cooked to be safe for consumption and so that it has a desired taste, texture, and appearance. One way of controlling the amount of frying is by monitoring and controlling the speed of a conveyor on which the food products are being moved through the process. Because another batter layer will be applied to the food products, as explained below, in accordance with methods described herein, the temperature and frying time may be different from food products having only a single applied layer of batter.

The fried or partially-fried food products are then conveyed to a second batter station where a second battering step or operation 32 takes place. The batter used with the apparatuses and methods for this second battering step described herein can be a tempura batter that "puffs up" or expands at least slightly when fried to provide a crunchy or crispy texture. Tempura batters are typically a mixture of flour and water, although the mixture may also include eggs and/or other ingredients such as corn starch, baking powder, and pepper. However, the batter used with the apparatuses and methods described herein can include other batters that may not necessarily be consistent with batters typically referred to as a tempura batter. In any case, the batter used will be selected to provide a desired texture and taste for the end food product.

The batter used for this second battering step is provided with a consistency so that it can flow at a particular rate from the bottom of a chamber or dispenser that includes apertures through its lower surface and onto a top surface of the food products passing below it. The equipment and associated apertures will be described in further detail below, but for purposes of the described method, these apertures are generally sized and spaced to provide a desired size and pattern of batter stripes on the surface of the food products. That is, smaller apertures will be used for smaller or thinner stripes and larger apertures will be used when it is desired to provide larger or wider stripes. The chamber or dispenser oscillates with a generally back and forth motion relative to the width of the conveyor at a predetermined speed so that it dispenses a certain volume of batter onto the food pieces moving past it along the conveyor. The pattern of the coating (e.g., the "waviness" of the pattern) can be controlled by the speed at which the chamber or dispenser oscillates and/or the speed at which the food products are conveyed past the batter chamber or dispenser, for example.

After being coated with batter stripes, the striped and battered food products are conveyed or otherwise transported to a second fryer in which they are deep fried in an edible oil in a second frying step or operation 34. The food products are fried at a suitable temperature and time until the second batter layer is sufficiently cooked to be safe for consumption and so that it reaches a desired taste, texture, and appearance. The amount of frying is controlled by monitoring and controlling the frying temperature and/or the speed of a conveyor on which the food products are moved through the second frying process.

The food products are then conveyed or otherwise transported to an oven in which they are further cooked or baked, as is represented by step or operation 36. This step involves baking the double-battered food products at a suitable temperature and time until the inner areas of the food products reach a desired temperature. In an exemplary operation, the food products are moved through the oven via a conveyor, although other types of transporting equipment can be used.

After the previously described steps are complete, the food products can be further transferred to a freezing station where they will be held for a time required to adequately freeze the food products. The frozen products can then be removed from the freezer and packaged for shipment to consumers.

Figure 6:
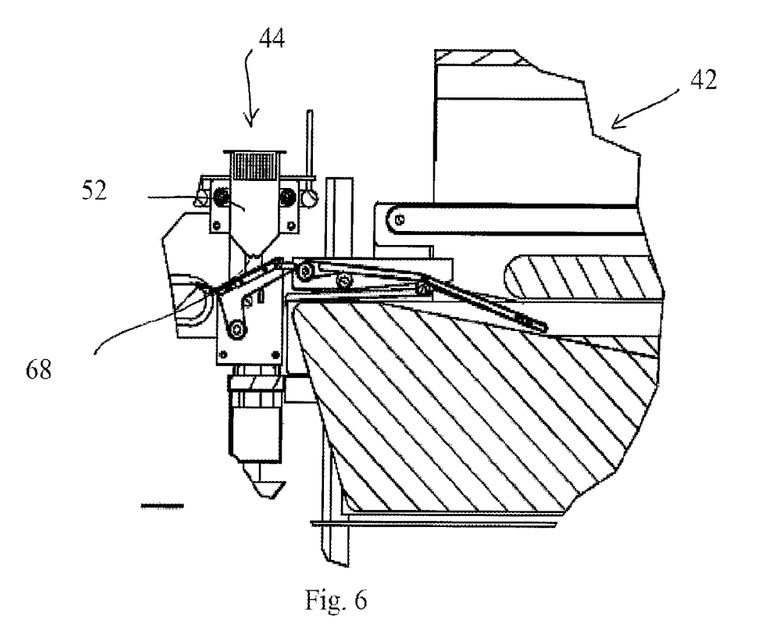
FIG. 6 is an enlarged cross-sectional view of a portion of the equipment illustrated in FIG. 5.
Figure 7:
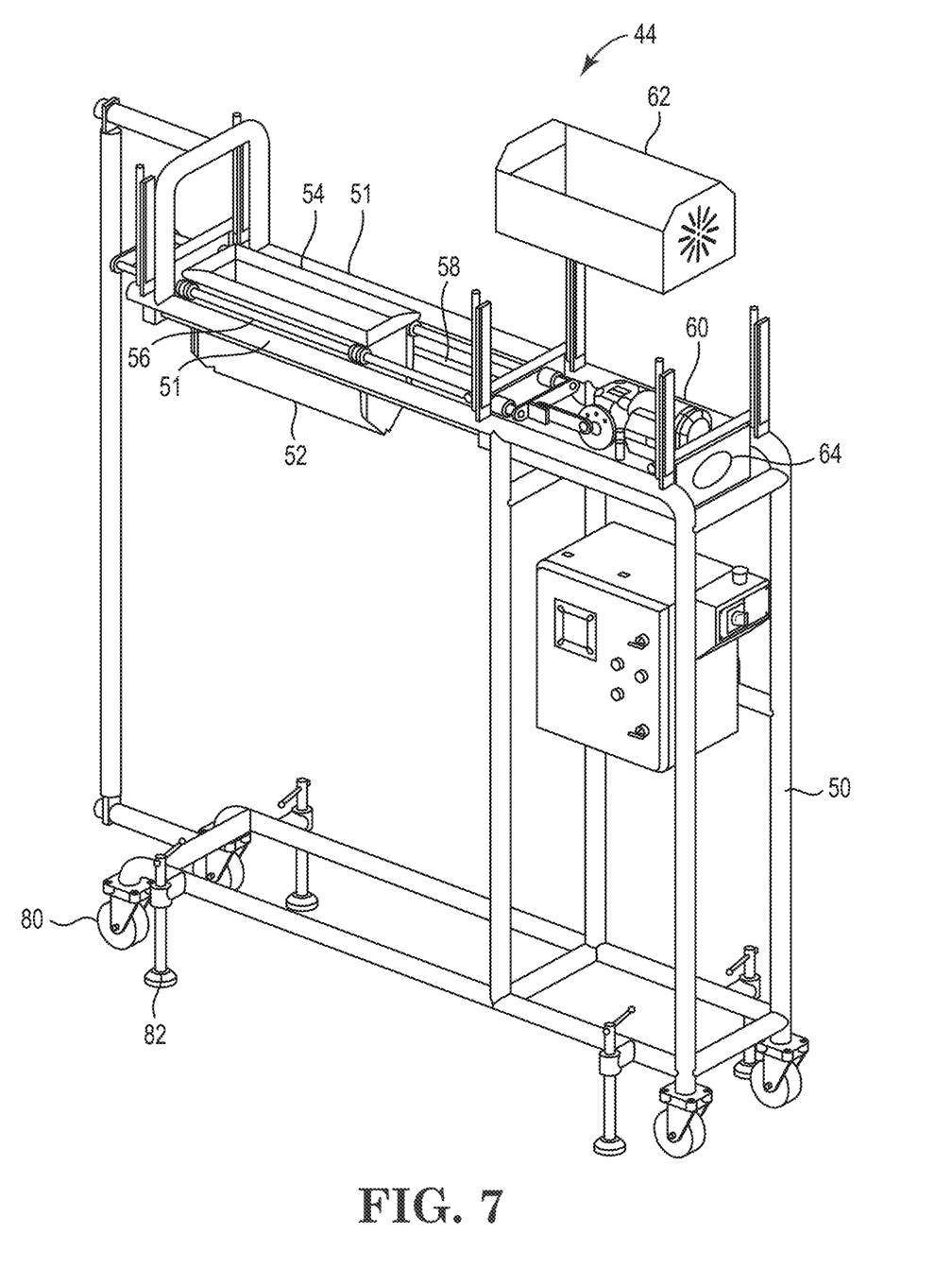
FIG. 7 is a perspective view of an exemplary embodiment of batter showering equipment.

Referring now to FIGS. 3-7, various views are provided of an exemplary embodiment of equipment used for a portion of the production of the food products described above. In particular, FIGS. 3-6 illustrate the equipment to perform the first frying step 30, the second battering step 32, and the second frying step 34 (which steps are discussed above relative to FIG. 2). In order to better illustrate the exemplary equipment used for the second battering step 32, FIG. 7 shows this equipment separate from the other production equipment shown in FIGS. 3-6.

In general, these figures illustrate a first fryer 40, a second fryer 42, and a battering machine 44 positioned between the fryers 40, 42. In embodiments described herein, the battering machine 44 is configured to be relatively narrow so that it can be positioned between adjacent pieces of equipment, such as the first and second fryers 40, 42, for example. The battering machine 44 may be retrofit such that it is positionable between existing stations of production equipment; however, other embodiments can include production equipment with specifically designed battering equipment positioned between adjacent fryers, and/or can include a battering machine that is proportionally wider or narrower than the battering machines illustrated and described herein.

Battering machine 44 includes a frame 50 having both generally horizontal frame members and generally vertical frame members. Upper frame members 51 are generally horizontal and support equipment that will be used to form batter stripes on food products. The outer perimeter of the frame 50 may be generally rectangular, as shown or may have a different shape. The frame 50 may also be configured with more or less frame members than illustrated, depending on the space available and the weight of the components that are to be mounted thereon. The bottom portion of the frame 50 includes wheels or casters 80 that can be used to move the battering machine 44 into a desired location. The bottom portion of the frame 50 also includes optional legs 82 adjacent to each of the wheels or casters 80 that can be used to stabilize the battering machine 44, especially during operation of the equipment. The wheels or casters 80 may also be lockable.

Figure 8:
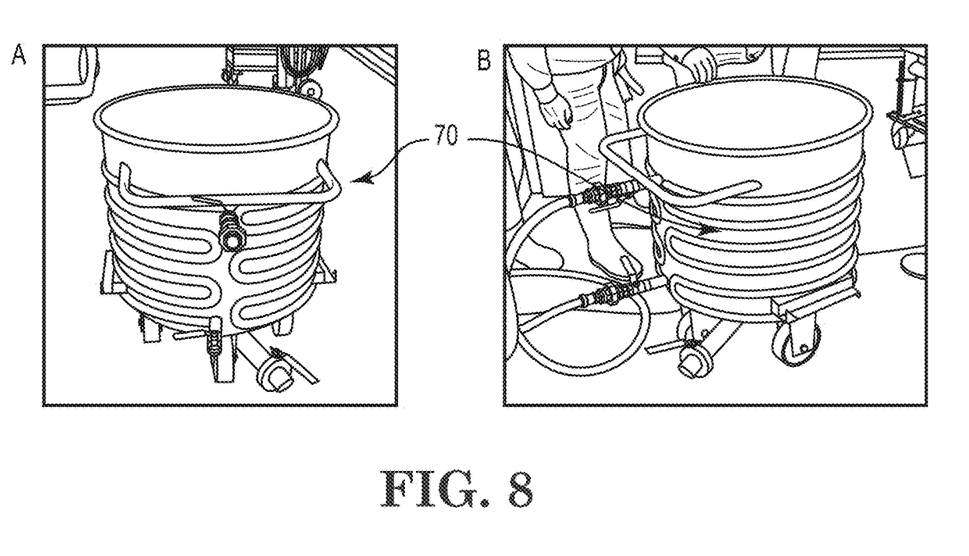
FIGS. 8A and 8B are photo images of an embodiment of a jacketed supply container for use with batter showering equipment.

A supply container 70 is provided that is Tillable or partially-Tillable with batter, either via a continuous supply tube or by manually adding premixed batter into the top of container 70, for example. In embodiments, supply container 70 may be open (as shown), may include a removable top, if desired, or may be configured as a generally closed container to which a batter supply mechanism (e.g., a supply tube) is attached. In embodiments, supply container 70 may include a cooling jacket or piping for heating or cooling fluid, e.g., water or a glycol, for use in regulating the temperature of container 70 (see FIGS. 8A and 8B). In other embodiments, when the batter of a particular supply container 70 is depleted or it is desired to use a different batter, such a supply container 70 can be removed and replaced with a filled or partially filled supply container 70.

A batter distribution chamber 52 is supported adjacent to the upper frame members 51 at one end of the battering machine 44. The distribution chamber 52 includes an opening 54 at its top area into which liquid batter can be supplied, such as via a supply tube 66. Alternatively, batter can be provided through the side or another area of the distribution chamber 52. In any case, supply tube 66 is in fluid communication with the supply container 70 such that batter will be moved from supply container 70 into the inner area of the distribution chamber 52. When batter is supplied to the opening 54, a filter or sieve can optionally be provided that filters incoming batter to remove large lumps of batter or other relatively large particulates so that only batter of a desired consistency can enter the system. The material that is filtered out by the filter or sieve at opening 54 will be deposited into a scrap container 76. Once this scrap container 76 is filled to a predetermined level, it can be removed and replaced with the same or a different container 76 that can accommodate more rejected material.

Batter that has optionally been filtered will be moved from the opening 54 toward the batter distribution chamber 52. Batter will exit the batter distribution chamber 52 through apertures 68 (see FIG. 6, for example) that extend through its bottom surface. The apertures 68 can be provided in any desired configuration and quantity to achieve a desired batter pattern on food products. For examples, the apertures 68 can be arranged in a single line, the apertures 68 can be staggered along a width of the distribution chamber 52, or the apertures 68 can be arranged in a different pattern. The size of each of the apertures of a batter distribution chamber 52 can be the same or different from each other, depending on the desired consistency of stripes for a batch of food products. That is, if it is desired for all of the batter stripes to be the same size and spaced the same distance from each other on certain food products, the apertures will be the same general size as each other and will be spaced at the same distance from each other across the width of the distribution chamber 52. It follows that if it is desired for some of the batter stripes to have different sizes or spacing relative to each other, the apertures will have different sizes and/or spacing from each other across the width of the distribution chamber 52.

Battering machine 44 further includes at least one shaft slide 56 and at least one shaft guide 58 that are operably attached to a motor 60 which facilitates oscillating or back-and-forth movement (i.e., shaking) of the batter distribution chamber 52 (i.e., movement both toward and away from the motor 60). The movement of the batter distribution chamber 52 can be generally perpendicular to the direction in which the food products are being conveyed, although other arrangements of these components relative to each other are considered to be within the scope of the present disclosure. Motor 60 is mounted on a motor support 64 and is provided with an optional protective cover 62.

As discussed above, the size of the apertures 68 of the batter distribution chamber 52 are designed or selected to allow a certain amount of batter to exit the chamber 52 and deposit onto food products passing below it. In order to further control the shape of the deposited batter, the speed, frequency, and amplitude at which the batter distribution chamber 52 is oscillated or shaken is coordinated with respect to the speed at which the food products are being conveyed past the bottom of the chamber 52. That is, when the food products are moving at a particular speed, the batter chamber 52 will be oscillated in such a way that a desired pattern of batter stripes is deposited onto each of the food products. The speed at which oscillating batter distribution chamber 52 and a conveyor or other mechanism moving the food products are moving relative to each other can be adjusted and coordinated to provide various batter patterns on the target food products. In certain exemplary embodiments, the batter pattern includes wavy stripes spaced at a generally equal distance from each other across the upper face of the food products.

In general, a continuous feed of batter will be supplied when food products are present and being conveyed past the batter distribution chamber 52. However, at least a portion of the batter may be deposited onto the conveyor belt in the areas where no food products are present. This batter will generally be reusable, and as such, the battering machine may also include a batter reuse and recycling system that includes an overflow container 72 and a return tube 74. The reusable or recyclable batter that is not deposited onto the food products will fall from the conveyor system into the overflow container, and then will flow through the return tube 74 back toward the supply container 70.

The battering and frying system can be controlled in such a way that a desired ratio of reused batter to new batter is maintained in the supply container 70. In an exemplary embodiment, the batter mixture in the supply container 70 includes a combination of approximately 30% reused or recycled batter and approximately 70% new batter, which can provide a desired viscosity of the batter mixture for showering onto food products as described herein. However, it is understood that the relative amounts of reused batter and new batter in a particular mixture can be slightly to significantly different than this ratio, depending on the desired properties for the batter mixture that will be exiting the supply container 70.

It is further contemplated that the temperature of the batter mixture may also be monitored and controlled during the coating process, wherein the acceptable temperature range for new batter may be different than the acceptable temperature range for a batter mixture that includes at least some recycled batter. In an exemplary embodiment, a new batter solution can have a target temperature of less than approximately 12 degrees Celsius and more particularly in a range of between approximately 8 degrees Celsius and approximately 12 degrees Celsius, while a batter solution that includes recycled batter can have a target temperature of less than approximately 20 degrees Celsius and more particularly in a range of between approximately 15 degrees Celsius and approximately 20 degrees Celsius. The target temperatures may be higher or lower than these exemplary temperatures, but in any case, they can be monitored and controlled to keep them within a desired temperature range.

Batter coated fried foods have a broad appeal and the patterned coating described herein provides additional taste and texture qualities that can be appealing to consumers. It is noted that while chicken pieces have been shown and described above, other food products can also be used with the production equipment and methods described herein. Other exemplary food products include fish and other meat products, vegetables, and fruits. In the case of other food products, the food products may be processed in a way that include different steps and equipment from that described in the exemplary method shown in FIG. 2.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A method of coating batter onto food products, comprising the steps of:

conveying at least one food product on a conveyor toward a battering machine;

conveying the at least one food product under a batter distribution chamber of the battering machine, wherein the batter distribution chamber comprises a plurality of spaced apertures extending through a bottom distribution chamber surface through which batter is dispensable, and wherein the batter distribution chamber oscillates in a direction that is generally perpendicular to a direction in which the at least one food product is being conveyed; and dispensing batter from the plurality of spaced apertures onto an outer surface of the at least one food product to provide a pattern of batter stripes on the outer surface;

wherein, prior to the step of conveying the at least one food product on a conveyor toward the battering machine, the at least one food product is fried in a first fryer.

2. The method of claim 1, wherein the step of conveying the at least one food product further comprises conveying at a speed that provides a predetermined pattern of batter stripes on the outer surface of the at least one food product.

3. The method of claim 1, wherein the step of conveying the at least one food product under the batter distribution chamber further comprises oscillating the batter distribution chamber at a frequency and amplitude that provides a desired pattern of batter stripes on the outer surface of the at least one food product.

4. The method of claim 1, further comprising a step of directing overflow batter to a supply container after the step of dispensing batter onto the outer surface of the at least one food product.

5. The method of claim 1, further comprising a step of combining overflow batter with new batter in a supply container to provide the batter.

6. The method of claim 5, wherein the step of combining new batter with overflow batter comprises controlling the batter mixture to provide a predetermined ratio of new batter to overflow batter.

7. The method of claim 5, wherein the step of combining new batter with overflow batter comprises controlling the temperature of the batter mixture.

8. The method of claim 5, wherein the step of combining new batter with overflow batter comprises controlling the temperature of the batter mixture to be within a range of between approximately 15 degrees Celsius and approximately 20 degrees Celsius.

9. The method of claim 1, wherein the step of dispensing batter from the plurality of spaced apertures further comprises controlling the temperature of the batter to be within a range of between approximately 8 degrees Celsius and approximately 12 degrees Celsius.

10. The method of claim 1, further comprising a step of frying the at least one food product in a second fryer after the step of dispensing batter from the plurality of spaced apertures onto an outer surface of the at least one food product.

11. The method of claim 10, further comprising a step of baking the at least one food product after the step of frying the at least one food product in a second fryer.

12. A method of coating batter onto meat products, comprising the steps of:
   in a first cooking step, frying at least one meat product that has a first batter layer to cook the first batter layer to produce at least one once-fried meat product;
   conveying the at least one once-fried meat product on a conveyor toward a battering machine;
   conveying the at least one once-fried meat product under a batter distribution chamber of the battering machine, wherein the batter distribution chamber comprises a plurality of spaced apertures extending through a bottom distribution chamber surface through which batter is dispensable, and wherein the batter distribution chamber oscillates in a direction that is generally perpendicular to a direction in which the at least one once-fried meat product is being conveyed;
   dispensing batter from the plurality of spaced apertures onto an outer surface of the at least one once-fried meat product to provide a pattern of batter stripes on the outer surface; and, thereafter,
   in a second cooking step, frying the batter stripes on the at least one once-fried meat product to produce at least one twice-fried meat product.

13. The method of claim 12, further comprising a third cooking step in which the at least one twice-fried meat product is cooked until an inner area of the at least one twice-fried meat product reaches a desired cooked temperature.

* * * * *